United States Patent Office 3,522,210
Patented July 28, 1970

3,522,210
CURABLE POLYGLYCIDYL ETHERS OF A DI-
HYDRIC PHENOL, CONTAINING FLEXIBLE
LINKAGES
Ralph F. Sellers, Somerset, and Samuel G. Smith, Jr.,
Hillsborough Township, N.J., assignors to Union Carbide Corporation, a corporation of New York
No Drawing. Filed Mar. 1, 1965, Ser. No. 436,287
Int. Cl. C08g 30/10
U.S. Cl. 260—47
12 Claims

ABSTRACT OF THE DISCLOSURE

This invention relates to curable polyglycidyl ethers of dihydric phenols having the formula:

HO—E—O—R—O—E—OH wherein E is the residuum of a dihydric phenol and R is a divalent organic radical having from 2 to 24 carbon atoms inclusive. The polyglycidyl ethers are used in fabrication of filament wound vessels and reinforced structures used in missiles, aircraft, and submersible vessels.

---

This invention relates in general to curable epoxy resins. More particularly, this invention relates to a new class of polyglycidyl ethers containing flexible linkages which when cured are characterized by improved strength and toughness as compared to prior epoxy resins.

Since epoxy resins were first introduced, there has been an increasing need felt for epoxy resins having strength and toughness characteristics particularly suited for specific applications. For instance, military applications usually require very high ratios of strength to total weight. This is especially true in the case of reinforced structures used in missles, aircraft, submersible vessels and the like.

It is an object, therefore, to provide a new class of epoxy resins which when cured have a very desirable high ratio of strength to total weight and are characterized by improved strength and toughness.

The curable epoxy resins of this invention are prepared by reacting an alkali metal mono salt of a dihydric phenol with an organic dihalide in the presence of an organic polar solvent to produce a dihydric phenol containing a flexible linkage and which can be represented by the following generic formula

HO—E—O—R—O—E—OH wherein E is the residuum of the dihydric phenol and R is a divalent organic radical. The radicals E and R are described in greater detail below. These dihydric phenols containing flexible linkages are epoxidized to the polyglycidyl ethers in the usual manner which when cured are characterized by improved strength and toughness and afford a high and desirable ratio of strength to total weight. As such the polylglycidyl ethers of this invention are especially useful in fabricating low weight, high strength reinforced structures such as filament wound vessels and reinforced structures used in missles, aircraft, and submersible vessels.

The term "toughness" as used herein refers not only to the load carrying properties of a cured specimen, usually determined by measuring yield strength, modulus, elongation or deformation in tension and compression, but also to the sensitivity of a cured specimen to various flaws, usually determined by measuring impact strength and stress crack resistance (stress intensity factor). Because epoxy resins are similar to metals in that the stronger a material is the more brittle it will be in the areas around material flaws, a true determination of toughness must reflect both the ability of a cured epoxy specimen to absorb energy while under stress and the sensitivity to flaws.

In the preparation of dihydric phenols containing flexible linkages according to this invention, the dihydric phenol is not narrowly critical. Suitable dihydric phenols can be mononuclear phenols such as hydroquinone, resorcinol and the like, or it can be a di- or polynuclear phenol. The phenols can also be substituted with inert nuclear substituents such as halogen, alkyl, alkoxy and the like inert substituents.

It is preferred that the dihydric phenol be a weakly acidic bisphenol such as, for example, the dihydroxy diphenyl alkanes or the nuclear halogenated derivatives thereof, such as, for example, the 2,2-bis-(4-hydroxyphenyl)propane, 1,1 - bis - (4 - hydroxyphenyl)-2-phenyl ethane, bis - (4 - hydroxyphenyl)methane, or the chlorinated derivatives containing one or two chlorines on each aromatic ring. Other materials also termed "bisphenols" can be used. These materials are the bisphenols of a symmetrical or unsymmetrical joining group, as, for example, ether oxygen (—O—), sulfide (—S—), carbonyl (—C̈—)
           O sulfone (—S̈—)
           O
           ‖
           O or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like biphenols where the hydroxyphenyl groups are bound to the same or different carbon atoms of an organic linking group.

Such dinuclear phenols can be characterized as having the structure:

$$HO\left(\underset{Ar}{\overset{(Y)_r}{|}}-R'-\underset{Ar}{\overset{(Y_1)_z}{|}}\right)OH$$

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine or iodine, or alkoxy radicals having from 1 to 4 carbon atoms, r and z are integers having a value from 0 to 4, inclusive, and R' is representative of a bond between aromatic carbon atoms as in dihydroxydiphenyl, or is a divalent radical, including for example, inorganic hydrocarbon radicals such as alkylene, alkylidene, cycloaliphatic, or the halogen, preferably fluorine, alkyl, aryl or like substituted alkylene, alkylidene and cycloaliphatic radicals as well as alkylcyclic, alkarylene and aromatic radicals and a ring fused to both Ar groups.

Examples of specific dihydric polynuclear phenols include among others: the bis-(hydroxyphenyl)alkanes such as 2,2 - bis-(4-hydroxyphenyl)propane, 2,4'-dihydroxydiphenylmethane, bis - (2-hydroxyphenyl)methane, bis-(4-hydroxyphenyl)methane, bis - (4-hydroxy-2,6-dimethyl-3-methoxyphenyl)methan, 1,1 - bis-(4-hydroxyphenyl)-ethane, 1,2 - bis(4-hydroxyphenyl)ethane, 1,1-bis-(4-hydroxy-2-chlorophenyl)ethane, 1,1 - bis - (3-methyl-4-hydroxyphenyl)propane, 1,3 - bis - (3-methyl-4-hydroxyphenyl)propane, 2,2-bis-(3-phenyl - 4 - hydroxyphenyl)-propane, 2,2-bis-(3-isopropyl - 4 - hydroxyphenyl)propane, 2,2-bis-(2-isopropyl - 4 - hydroxyphenyl)propane, 2,2-bis-(4-hydroxynaphthyl)propane, 2,2 - bis - (4-hydroxyphenyl)pentane, 3,3-bis-(4-hydroxyphenyl)pentane, 2,2-bis-(4 - hydroxyphenyl)heptane, bis-(4-hydroxyphenyl)phenylmethane, 2,2-bis-(4 - hydroxyphenyl)-1-phenylpropane, 2,2-bis-(4-hydroxyphenyl) - 1,1,1,3,3,3 - hexafluoropropane and the like;

Di(hydroxyphenyl)sulfones such as bis-(4 - hydroxyphenyl)sulfone, 2,4'-dihydroxydiphenyl sulfone, 5'-chloro-2,4'-dihydroxydiphenyl sulfone and the like;

Di(hydroxyphenyl)ethers such as bis-(4-hydroxyphenyl)ether, the 4,3'-, 4,2'-, 2,2'-, 2,3'-, dihydroxydiphenyl ethers, 4,4'-dihydroxy-2,6 - dimethyldiphenyl ether, bis-(4-hydroxy-3-isobutylphenyl) ether, bis-(4-hydroxy - 3-isopropylphenyl) ether, bis-(4-hydroxy - 3 - chlorophenyl) ether, bis-(4-hydroxy - 3 - fluorophenyl) ether, bis-(4-hydroxy - 3 - bromophenyl) ether, bis-(4-hydroxynaphthyl) ether, bis-(4-hydroxy - 3 - chloronaphthyl) ether, 4,4'-dihydroxy - 3,6 - dimethoxydiphenyl ether, 4,4'-dihydroxy-2,5-diethoxydiphenyl ether, and like materials.

It is also contemplated in this invention to use two different dihydric phenols. Thus the —E— residuum can be the same or different aromatic residua. As used herein, the residuum —E— of a dihydric phenol refers to the residua of a dihydric phenol after removal of the two aromatic hydroxyl groups. Thus, the dihydric phenols containing flexible linkages contain two —E— groups bonded to the flexible linkage (—R—) through aromatic ether oxygen atoms.

The alkali metal mono salt of the dihydric phenols can be prepared by reacting a dihydric phenol with substantially stoichiometric amounts of an alkali metal, alkali metal hydroxide, alkali metal hydride, alkali metal alkoxide or alkali metal alkyl. The mono salt can be prepared separately by reacting an alkali metal compound and dihydric phenol in an aqueous medium or by converting a dihydric phenol in situ in the organic polar reaction solvent prior to adding the aliphatic dihalide co-reactant.

Any of the alkali metal compounds can be used, that is to say any alkali metal mono salt of a dihydric phenol can be used as the one reactant. Potassium and sodium mono salts are preferred because of their low cost.

According to the present invention, flexible linkages are introduced into a dihydric phenol by reacting with an organic dihalide. These linkages allow considerable molecular movement and separate the epoxy reactive sites. These flexible linkages are thought to account for the improved properties of the cured polyglycidyl ethers of this invention.

Suitable organic dihalides have the formula

X—R—X wherein X is a halogen atom (e.g., F, Cl, Br, I) and R is a divalent organic radical having from 2 to 24 carbon atoms such as alkylene radicals having from 2 to 24 carbon atoms inclusive, oxyalkylene radicals having from 2 to 24 carbon atoms inclusive and containing at least one aliphatic ether oxygen atom in which each halogen atom is attached to a carbon atom of a different alkyl group having at least one but preferably two carbon atoms and being separated by the ether oxygen atom, and radicals having from 8 to 24 carbon atoms represented by the formula —R″—Ar′—R″— wherein R″ each are alkylene groups and Ar′ is a divalent aromatic group. The divalent organic radical R can also be substituted with inert substituents such as alkyl, alkoxy and the like.

Suitable organic dihalides where R is an alkylene radical include 1,2-dichloroethane, 1,4-dibromopropane, 1,4-dichlorobutane, 1,5-dichloropentane, 1,2-dichloropropane, 1,18-dichloro-octadecane, and the like.

Suitable organic dihalides where R is an oxyalkylene radical include di(2-chloroethyl)ether, 1,2-di(2-chloroethoxy)ethane, di(2-chloropropyl)ether, 3,3'-dichlorodiisopropyl ether, and the like.

Suitable organic dihalides where R is a radical having the formula —R″—Ar′—R″— include α,α'-dichloroxylylene, β,β'-dichlorodiethyl benzene, α,α'-dichlorodimethylnaphthylene, α,α'-dichlorodimethyldiphenyl ether, β,β'-dichlorodiethyldiphenyl, and the like.

The reaction between an alkali metal mono salt of a temperatures as low as about 20° C. However, for shorter reaction times, it is preferred to conduct the reaction at elevated temperatures, for example above about 100° C., and below the decomposition temperatures of the solvent, reactants and product formed, preferably within the range of from about 75° to about 125° C.

The reaction between an alkali metal mono salt of a dihydric phenol and an organic dihalide proceeds on essentially an equimolar basis, that is two moles of an alkali metal mono salt of a dihydric phenol react with one mole of an organic dihalide to form one mole of a dihydric phenol having a flexible linkage and two moles of an alkali metal halide. The reaction can be represented by the following equation:

2HO—E—OM + X—R—X → 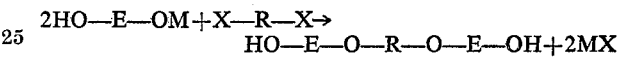
HO—E—O—R—O—E—OH + 2MX wherein E, R, and X are as previously defined and M represents an alkali metal molecule. The amounts of reactants employed can vary slightly, for instance up to about 5 percent, away from an equimolar basis. However, in order to secure high product yields, it is preferred to employ substantially equimolar amounts of reactants.

The reaction between an alkali metal mono salt of a dihydric phenol and an organic dihalide proceeds without the need of a catalyst, but the use of an organic polar reaction solvent has been found to be critical in this invention in order to reduce reaction times without going to drastic conditions and sacrificing yields. In other mediums such as water, the reaction is inordinately long. It is also possible, and sometimes desirable, to employ a second organic liquid as a cosolvent for the reaction. Suitable polar solvents include dimethylsulfoxide, dimethyl sulfone, diethylsulfoxide, diethylsulfone, diisopropylsulfone, tetrahydrothiophene-1,1-dioxide (commonly called tetramethylene sulfone or sulfolane), tetrahydrofurane, dimethylformamide, 1,4-dioxane, and the like.

Suitable cosolvents for the reaction should be inert with respect to the reactants, polar solvent, and product formed and be unaffected by the reaction conditions. Illustrative of such solvents are benzene, heptane, xylene, toluene, water, chlorobenzene, dichlorobenzene, methylethylketone, and the like.

For purposes of preventing oxidation of the reactants, solvent and product formed, it is desirable to exclude oxygen from the reaction mass by nitrogen blanketing and like techniques.

The polyglycidyl ethers of this invention are obtained by reacting the aforedescribed dihydric phenols having flexible linkages with an aliphatic chlorhydrin such as epichlorohydrin or glycerol dichlorohydrin in aqueous caustic alkali as is well known in the art. The preparation of a polyglycidyl ether of a dihydric phenol having the generic formula described above with epichlorohydrin can be represented by the following equation:

HO—E—O—R—O—E—OH + 2ClCH$_2$—CH—CH$_2$ + two equivalents of alkali 
\\O/

CH$_2$—CH—CH$_2$—O—E—O—R—O—E—O—CH$_2$—CH—CH$_2$ 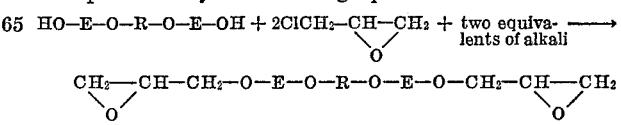
\\O/                                                \\O/

The polyglycidyl ethers prepared according to this invention have an epoxy equivalency greater than one and are solids or semi-solids at 25° C.

In order to cure the polyglycidyl ethers of this invention to hard, tough, insoluble products having high heat distortion values, it is customary to add curing agents thereto. Curing agents are of two general types: (1) catalysts and (2) so-called hardners. Catalysts are compounds which in general initiate a self-polymerization of the epoxide and are used in catalytic amounts, i.e. from about 0.02 to about 4% by weight based on the total weight of the epoxide. The so-called hardening agents are compounds which generally undergo a reaction with the epoxide through the epoxy group, and are generally used in stoichiometric amounts.

Illustrative of the catalysts which can be conveniently used are tertiary amines, hydroxides, acids, Friedel-Crafts reagents and the like. Illustrative thereof are: benzyldimethylamine, benzyltrimethylammonium hydroxide, alkali hydroxides, acidic catalysts, such as sulfuric acid, phosphoric acid, perchloric acid, polyphosphoric acid, and the various sulfonic acids, e.g. toluene sulfonic acid, benzene sulfonic acid; the metal halide Friedel-Crafts reagents, such as stannic chloride, zinc chloride, boron trifluoride, aluminum chloride, and ferric chloride. These various metal halide catalysts can be employed in the form of complexes, such as the etherates and amine complexes. Typical metal halide complexes are piperidine-boron trifluoride, monoethylamine-boron trifluoride, and ethylether-boron trifluoride.

As hardening agents, those organic compounds having two or more groups which are reactive with the epoxy groups can be conveniently used. Such compounds are primary and secondary amines, phenols, carboxylic acids and anhydrides thereof. As previously stated, hardening agents are generally employed in stoichiometric amounts as is well-known by those skilled in the art.

Typical amines are the aliphatic polyamines, such as ethylenediamine, diethylenetriamine, triethylenetetramine, tetraethylenepentamine, polyethylenepolyamines, propylenediamine, dipropylenetriamine, polypropylenepolyamines, butylenediamines, penthylenediamines, hexylenediamines, octylenediamines, nonylenediamines, decylenediamines, 1,-diamino-2-propanol, 3,3'-imino-bis-(propylamine), aromatic polyamines, such as meta-, ortho- and para-phenylenediamines, 1,4-naphthalenediamine, 1,4-anthradiamine, 3,3'-biphenyldiamine, xylylenediamine, 3,5-biphenylamine, 3,4-toluenediamine, alpha, alpha'-biparatoluidine, para, para'-methylenedianiline, 1-methoxy-6-methylmeta-phenylene-diamine, and heterocyclic polyamines, such as piperazine, 2,5-dimethylpiperazine, 2,4-diamino-5-(aminoethyl)pyrimidine, 2,4,6-triaminopyrimidine, 3,9-bis(aminoethyl)spirobimetadioxane and the like, N-hydroxyethylethylenediamine, N,N'-bis-(hydroxyethyl) ethylenediamine, N,N - bis(hydroxyethyl)diethylenetriamine, N,N'-bis(hydroxyethyl)diethylenetriamine, N,N''-bis(hydroxyethyl)diethylenetriamine, N-hydroxypropyldiethylenetriamine, N,N - bis(hydroxypropyl)diethylenetriamine, N,N''-bis(hydroxypropyl)diethylenetriamine, N-hydroxyethylpropylenediamine, N- hydroxypropylpropylenediamine, N-hydroxyethyldipropylenetriamine, N,N-bis (hydroxyethyl)dipropylenetriamine, N,N - bis(hydroxyethyl)dipropylenetriamine, tris(hydroxyethyl)triethylenetetramine.

Representative polycarboxylic acids include malonic acid, succinic acid, glutaric acid, adipic acid, isosebacic acid, alkyl-succinic acids, alkenylsuccinic acids, ethyl-butenylsuccinic acid, maleic acid, furmaric acid, itaconic acid, citraconic acid, mesaonic acid, glutaconic acid, ethylidenemalonic acid, isopropylidenemalonic acid, allyl-malonic acid, muconic acid, alphahydro-muconic acid, amyl-2,5-heptadienedioic acid, 3-hexenedioic acid, 4,6-de-beta-hydromuconic acid, diglycolic acid, dilactic acid, 4-cadienedioic acid, 2,4,6,8-decatetraenedioic acid, 1,2-cyclohexanedicarboxylic acid, 1,4 - cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3-carboxcinnamic acid, 1,2,4-hexanetricarboxylic acid, 2-propyl-1,2,4-pentanetricarboxylic acid, 5-octane-3,3,6-tricarboxylic acid, 1,2,3-propanetricarboxylic acid, 3-hexene-2,2,3,4-tetracarboxylic acid, 1,2,3,4-benzenetracarboxylic acid, 1,2,3,5-benzenetracarboxylic acid, 1,2,4,5-tetracarboxylic acid, benzenepentacarboxylic acid, and benzeneohexacarboxylic acid.

Among the phenols which are suitable are the following: catechol, hydroquinone, hydroxyhydroquinone, phloroglucinol, resorcinol, and pyrogallol; the di- or polynuclear phenols, such as the bisphenols described in the Bender et al., U.S. Pat. No. 2,506,486. The phenols may contain alkyl, aryl or halogen ring substituents as exemplified by the alkyl resorcinols, the tribromo resorcinol and the diphenols containing alkyl and halogen substituents on the aromatic ring (Bender et al., U.S. Pat. No. 2,506,486).

The polyhydric polynuclear phenols can consist of two or more phenols connected by such groups as methylene, oxygen, alkylene ether, ketone and sulfone. The connecting groups are further exemplified by the following compounds: bis(p-hydroxyphenyl)ether, bis(p-hydroxyphenl) ketone, bis(p-hydroxyphenyl) methane, bis(p-hydroxyphyenyl)dimethylmethane, bis(p-ydroxypenyl)sulfone.

In the following examples, which are intended to further illustrate the present invention without limiting the same, the following test procedures were used in determining physical properties listed.

Flexural properties __ ASTM D790-59T.
Tensile properties ___ ASTM D638-60T.
Heat distortion _____ ASTM D648-56.
Compressive propertie ASTM D695-54.
Izod impact _____ ASTM D256-56.
Hydroxyl content ___ ASTM E222-64T.
Toughness in tension _. Burke et al., Fatigue,
　　　　　　　　　　　　Syracuse University Press
　　　　　　　　　　　　(1964), pages 108 and 118.
Stress intensity factor _ ASTM Tentative Method of
　　　　　　　　　　　　Test for Crack Propagation
　　　　　　　　　　　　Resistance of Plastics (1960).

Epoxy equivalency refers to the number of epoxy tical techniques. Epoxy assay refers to the grams per gram groups per molecule and is determined by standard analy-equivalent of epoxy determined according to ASTM D1652.

EXAMPLES 1–10.—PREPARATION OF DIHYDRIC PHENOLS CONTAINING FLEXIBLE LINKAGES

General procedure

Into a three liter flask equipped with a reflux condenser, stirrer, dropping funnel, nitrogen inlet tube, and thermometer was charged 2 moles of a dihydric phenol and the polar reaction solvent with or without a cosolvent. The mixture was stirred under a blanket of nitrogen until all of the dihydric phenol has dissolved in the reaction solvent. This usually resulted in a 10–15° C. rise in temperature. Enough of 50 percent aqueous sodium hydroxide was then added with the dropping funnel of a 15–30 minute period to charge 2 moles of sodium hydroxide into the reaction mass while the dihydric phenol was converted in situ to the monosodium salt, the reaction exotherm caused an increase in temperature to about 90° C. The temperature of the reaction mass was then raised to the reaction temperature and 1 mole of an aliphatic dihalide was added with the dropping funnel over a period of 15–30 minutes. The reaction was allowed to proceed until the pH of the reaction mass was between 7 and 8. Four hundred grams of toluene were then added and the reaction flask equipped with a Dean-Stark trap. Water was then removed as an azeotrope with toluene for 1 to 2 hours until the reaction mass was substantially dehydrated. Sodium chloride salt by-product was removed by filtering and the filtrate neutralized with concentrated HCl to a pH between 6 and 7 and refiltered. Product recovery was accomplished by one of two methods:

(1) The product was precipitated with a 2-liter water wash and the precipitate vacuum stripped at 210°–225° C. under 30–35 mm. Hg.

(2) The reaction mass was stripped at 170° C. under 760 mm. Hg and then vacuum stripped at 210°–225° C. under 30–35 mm. Hg.

The end product obtained in both cases was a dark-tacky solid. The reactants and amounts used, reaction conditions, solvent or solvents and amounts used, yields, and other data are given in the following table. In the table, the dihydric phenols and the organic dihalides used are represented as follows Dihydric phenols:

I=2,2-bis(4-hydroxyphenyl)propane, (bisphenol A)
II=Resorcinol
III=Hydroquinone
IV=4,4'-dihydroxydiphenyl sulfone Organic dihalides:

A=di(2-chloroethyl)ether
B=1,2-di(2-chloroethoxy)ethane
C=1,5-dichloropentane
D=1,4-dichlorobutane.

tion of the residue were dissolved in methylisobutyl ketone (to about 50 percent solids) and the solution was water washed free of salts and residual alkali. The epoxy resin solution was then solvent stripped to 135° C. pot temperature under about 50 mm. Hg pressure. The molten epoxy resin was readily poured from the flask to a suitable container. Results are summarized below.

| Example No. | Dihydric Phenol Containing Flexible Linkage from Example | Hydroxyl Content of Dihydric Phenol, Percent | Epoxy Assay, g./g. mole |
|---|---|---|---|
| 11 | 2A | 6.28 | 428.6 |
| 12 | 3 | 6.25 | 360.7 |
| 13 | 1B | 6.45 | 345.8 |
| 14 | 2B | 6.0 | 375.8 |
| 15 | 1A | 6.66 | 365.5 |

EXAMPLES 16–20.—CURING DIGLYCIDYL ETHERS CONTAINING FLEXIBLE LINKAGES

The diglycidyl ethers (epoxy resins) from Examples 11–15 were heated to a temperature of 80–100° C. and mixed with a stoichiometric amount of p,p'-diaminodi-

| Ex. No. | Dihydric Phenol | Organic Dihalide | Aq. 50% NaOH, g. | Reaction Time Hrs. | Reaction Temperature, °C. | Polar Reaction Solvent | Cosolvent | Yield Percent | Recovery Procedure | Hydroxyl Content |
|---|---|---|---|---|---|---|---|---|---|---|
| 1A | I, 912 g. (4 moles) | A, 286 g. (2 moles) | 360 | 4–5 | 100–110 | DMSO [1] 600 g. | Toluene, 600 g. | 95 | 2 | 6.66 |
| 1B | I, 456 g. (2 moles) | A, 143 g. (1 mole) | 160 | 20–21 | 100–110 | DMSO, 400 g. | | 88 | 1 | 6.44 |
| 1C | do | do | 160 | 4½ | 100–117 | DMSO, 150 g. | MIBK [2] 400 g. | 99 | 2 | 6.83 |
| 2A | I, 456 g. (2 moles) | B, 188 g. (1 mole) | 160 | 23–24 | 100–110 | DMSO, 100 g. | MIBK, 300 g. | 94.6 | 2 | 6.00 |
| 2B | do | do | 160 | 5–6 | 100–127 | DMSO, 150 g. | MIBK, 500 g. | 95 | 2 | 6.37 |
| 2C | do | do | 160 | 5–6 | 100–146 | DMSO, 150 g. | MCB,[3] 400 g. | 92 | 2 | 6.35 |
| 3 | I, 456 g. (2 moles) | C, 141 g. (1 mole) | 160 | 20–21 | 100–105 | DMSO, 473 g. | | 96.6 | 1 | |
| 4A | II, 440 g. (4 moles) | A, 286 g. (2 moles) | 320 | 1 | 100–110 | DMSO, 400 g. | | 98.4 | 2 | 12.12 |
| 4B | II, 550 g. (5 moles) | A, 358 g. (2.5 moles) | 400 | 15–16 | 100 110 | DMSO, 1,000 g | | 74.56 | 1 | 7.60 |
| 5A | II, 440 g. (4 moles) | B, 376 g. (2 moles) | 320 | 3–4 | 100–110 | DMSO, 400 g. | | 83.6 | 2 | 10.28 |
| 5B | do | do | 320 | 17–18 | 100–110 | DMSO, 400 g. | | 90.3 | 2 | 10.15 |
| 6A | III, 220 g. (2 moles) | A. 143 g. (1 mole) | 160 | 17–18 | 100–105 | DMSO, 400 g. | | 82.5 | 1 | 6.87 |
| 6B | III, 440 g. (4 moles) | A, 286 g. (2 moles) | 320 | 19–20 | 100–110 | DMSO, 700 g. | | | 2 | 11.23 |
| 7 | III, 440 g. (4 moles) | B, 376, g. (2 moles) | 320 | 21–22 | 100–125 | DMSO, 700 g. | | 97 | 2 | 8.61 |
| 8A | IV, 500 g. (2 moles) | A, 143 g. (1 mole) | 160 | 21 | 100–124 | DMSO, 500 g. | Toluene, 500 g. | 10 | 2 | 5.52 |
| 8B | do | do | 160 | 5 | 100–124 | DMSO, 180 g. | MIBK, 480 g. | 99 | 2 | 6 |
| 9 | IV, 500 g. (2 moles) | B, 188 g. (1 mole) | 160 | 5 | 100–124 | DMSO, 180 g. | MIBK, 480 g. | 100 | 2 | |
| 10 | I, 912 g. (4 moles) | D, 254 g. (2 moles) | 320 | 8–9 | 100–107 | DMSO, 912 g. | Toluene, 960 g. | 1 | 1 | 6.66 |

[1] DMSO=Dimethylsulfoxide.  [2] MIBK=Methylisobutyl ketone.  [3] MCB=Monochlorobenzene.

EXAMPLE 11–15.—PREPARATION OF DIGLYCIDYL ETHERS FROM DIHYDRIC PHENOLS CONTAINING FLEXIBLE LINKAGES

In a four-neck, round bottom, flask equipped with an agitator, thermometer, addition funnel and a condenser for reflux and/or distillation, one mole of a bisphenol from Examples 1–10 was dissolved in six moles epichlorohydrin and ethyl alcohol (about 60 weight percent based on the bisphenol). The solution was heated to 60–65° C. and two-and-one-half moles of 50 percent aqueous sodium hydroxide was added as follows:

0.25 mole 50 percent NaOH added in 1 hr. at 60–65° C.
0.25 mole 50 percent NaOH added in ½ hr. at 60–65° C.
1.75 moles 50 percent NaOH added in 1 hr. at 60–65° C.
0.25 mole 50 percent NaOH added in 1 hr. at 60–65° C.

The excess epichlorohydrin, alcohol and water were vacuum distilled off to conditions of 125° C. pot temperature under about 50 mm. Hg pressure. The organic porphenyl methane hardener, separately heated to a temperature of 80–100° C., and poured into preheated molds coated with a silicone mold release agent, and cured. Test specimens were molded into bars for testing for tensile strengths and Izod impact, rods for testing for compressive strength and plaques for testing for stress intensity factor. Results are summarized below.

| Example No. | 16 | 17 | 18 | 19 | 20 |
|---|---|---|---|---|---|
| Diglycidyl ether from example | 11 | 12 | 13 | 14 | 15 |
| Hardner, Parts per hundred | 11.4 | 13.8 | 14.3 | 13.1 | 13.6 |
| Cure: | | | | | |
| Gel, °C | [1] 115 | [1] 85 | [1] 85 | [1] 85 | 4.21×10⁵ |
| Post Cure, °C | [3] 165 | [3] 165 | [3] 165 | [3] 165 | [3] 160 |
| Hardness—Shore D | 86 | 83 | 85 | 83 | 87 |
| Heat Distortile, °C | 86.7 | 96.2 | 100.6 | 75.3 | 96.5 |
| Flexural Strength | 17,092 | 14,963 | 15,779 | 16,240 | 15,663 |
| Modulus | 4.32×10⁵ | 3.85×10⁵ | 4.14×10⁵ | 4.44×10⁵ | [2] 105 |
| Tensile Strength | 10,840 | 10,266 | 10,627 | 10,164 | 10,864 |
| Modulus | 3.98×10⁵ | 3.46×10⁵ | 3.83×10⁵ | 3.92×10⁵ | 3.93×10⁵ |
| Percent Elongation | 5.98 | 6.50 | 7.35 | 5.05 | 7.18 |
| Compressive Strength | 15,757 | 18,068 | 14,943 | 14,621 | 17,069 |
| Izod Impact | 0.80 | 0.77 | 0.75 | 1.02 | 0.46 |

[1] Overnight.  [2] For 24 hours.  [3] For 4 hours.

EXAMPLE 23

For purposes of demonstrating the improved properties of the cured polyglycidyl ethers of this invention, and especially the Izod Impact and stress intensity factor, a well known epoxy resin, the diglycidyl ether of 2,2-bis-(4-hydroxyphenyl)propane (bisphenol A) was prepared as in Examples 11–16 and cured into a test specimen with a stoichiometric amount of meta-phenylenediamine hardener as in Examples 17–22. The properties of this cast specifen were then compared to a diglycidyl ether of this invention having the formula $$CH_2{=}CH{-}CH_2{-}O{-}\underset{O}{\phantom{x}}{-}\underset{CH_3}{\overset{CH_3}{C}}{-}\underset{\phantom{x}}{\phantom{x}}{-}O{-}CH_2{-}CH_2{-}O{-}CH_2{-}CH_2{-}O{-}\underset{\phantom{x}}{\phantom{x}}{-}\underset{CH_3}{\overset{CH_3}{C}}{-}\underset{\phantom{x}}{\phantom{x}}{-}O{-}CH_2{-}CH{-}CH_2$$

This diglycidyl ether was prepared as in Examples 1–10 from bisphenol A and di(2-chloroethyl)ether, epoxidized as in Examples 11–16 with epichlorohydrin, and cured into a test specimen with a stoichiometric amount of meta-phenylenediamine hardener as in Examples 17–22. Results are summarized below.

| Property | Example 23<br>Cured Diglycidyl Ether Contining Flexible Linkages | Control<br>Cured Diglycidyl Ether of Bisphenol A |
|---|---|---|
| Tensile Properties: | | |
| Yield strength, p.s.i. | 10,800 | 12,900 |
| Modulus, p.s.i. | 420,000 | 460,000 |
| Elongation at yield, percent | 7.0 | 6.4 |
| Toughness in tension, in. lbs./in.$^3$ | 589 | 591 |
| Compressive Properties: | | |
| Yield strength, p.s.i. | 16,500 | 19,200 |
| Modulus, p.s.i. | 460,000 | 440,000 |
| Deformation at yield, percent | 6.4 | 11.0 |
| Modulus of resilience | 91 | 92 |
| Izod Impact, ft./lbs. in notch | 0.71 | 0.31 |
| Stress Intensity Factor (K), lbs./in.$^{1.5}$ | 1,440 | 1,046 |

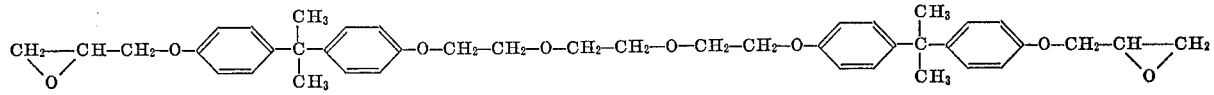

We claim:

1. A curable polycylcidyl ether of a dihydric phenol having the formula:

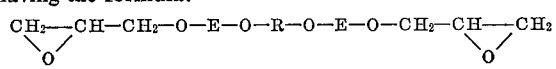

wherein E is the residuum of a dihydric phenol free of interfering reactive substituents and R is a divalent organic radical selected from the group consisting of alkylene radicals having from 2 to 24 carbon atoms inclusive, and radicals having from 8 to 24 carbon atoms inclusive represented by the formula:

—R″—Ar′—R″— wherein each R″ is an alkylene group and Ar′ is a divalent hydrocarbon radical having a maximum of 10 carbon atoms.

2. Curable polyglycidyl ether having the formula

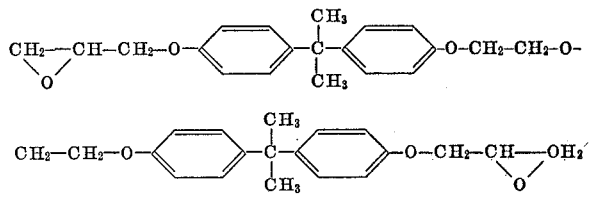

3. Curable polyglycidyl ether having the formula

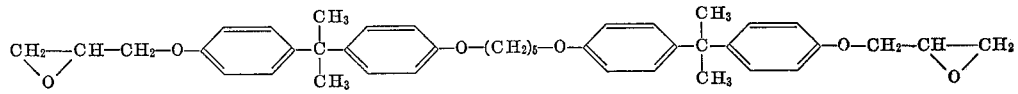

4. Curable polyglycidyl ether having the formula

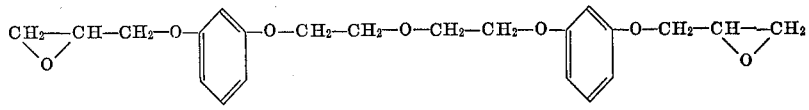

5. Curable polyglycidyl ether having the formula

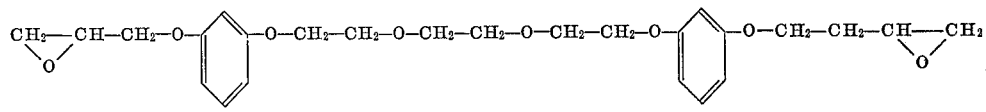

6. Curable polyglycidyl ether having the formula

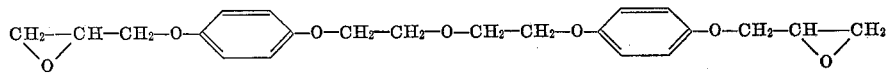

7. Curable polyglycidyl ether having the formula

8. Curable polyglycidyl ether having the formula

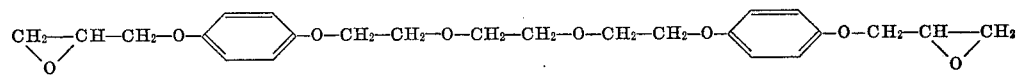

9. Curable polyglycidyl ether having the formula

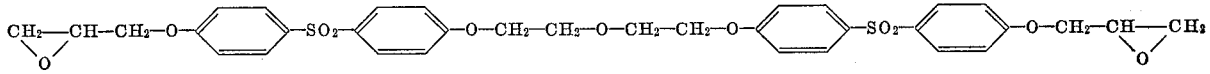

10. Curable polyglycidyl ether having the formula
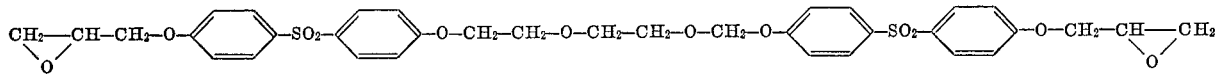
11. Curable polyglycidyl ether having the formula
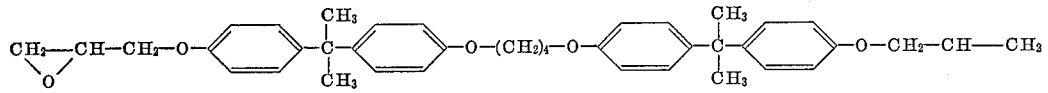
12. The cured product of claim 1.
References Cited
UNITED STATES PATENTS
| | | | |
|---|---|---|---|
| 2,668,807 | 2/1954 | Greenlee | 260—47 |
| 3,297,519 | 1/1967 | Pamboset | 260—47 |
WILLIAM H. SHORT, Primary Examiner
T. E. PERTILLA, Assistant Examiner
U.S. Cl. X.R.
260—348

UNITED STATES PATENT OFFICE
CERTIFICATE OF CORRECTION

Patent No. 3,522,210                                  July 28, 1970

Ralph F. Sellers et al.

It is certified that error appears in the above identified patent and that said Letters Patent are hereby corrected as shown below:

Column 4, line 63, "epichlorohydric" should read -- epichlorohydrin --. Column 5, line 36, "penthylenediamines" should read -- pentylenediamines --; line 38, "1,-diamino" should read -- 1,3-diamino --; line 65 should be canceled and inserted after line 66; same column 5, line 73, "3-carboxcinnamic" should read -- 3-carboxycinnamic --. Column 6, line 1, "benzenetra-" should read -- benzenetetra --; line 2, "benzenetracarboxylic" should read -- benzenetetracarboxylic --; same line 2, "1,2,4,5-" should read -- 1,2,4,5-benzene- --; line 3, "benzeneohexacarboxylic" should read -- benzenehexacarboxylic --; line 19, "-hydroxyphenl" should read -- hydroxyphenyl --; line 21, "phyenyl)" should read -- phenyl) --; same line 21, ")p-ydroxypenyl)" should read -- (p-hydroxyphenyl) --; line 40, "tical techniques" should read -- groups per molecule and is determined by standard analytical techniques. --; line 40, should be canceled. Column 7, last line

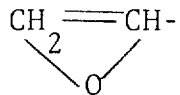        should read        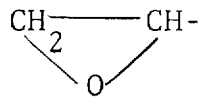

Column 8, in Example 2B, "MIBK 500 g" should read -- MIBK 400 g --; in Example 8A; "Yield Percent" should read -- 100 --; in Example 8B, in the Hydroxyl Content column "6" should read -- --- --; in Example 10, "Yield Percent" should read -- 100 --; in the table between lines 45 to 60, "Hardner" should read -- Hardener --; "Distortiln" should read -- Distortion --; in Example 17, "Flexural Strength" should read -- 14,963 --; in Example 18, "Flexural Strength" should read -- 15,779 --; in Example 19, "Flexural Strength" should read -- 16,240 --; in Example 20, "Gel, °C" should read -- $^1$105 --; "Flexural Modulus" should read -- $4.21 \times 10^5$ --; line 69, "specifen" should read -- specimen --. Column 9, line 21, "1,046" should read -- 1,057 --.

Signed and sealed this 5th day of January 1971.

(SEAL)
Attest:

EDWARD M. FLETCHER, JR.                      WILLIAM E. SCHUYLER, JR.
Attesting Officer                                       Commissioner of Patents